Feb. 20, 1968     W. D. WALLACE ET AL     3,369,802
ADJUSTABLE DAMPED SPRING
Filed Feb. 2, 1966
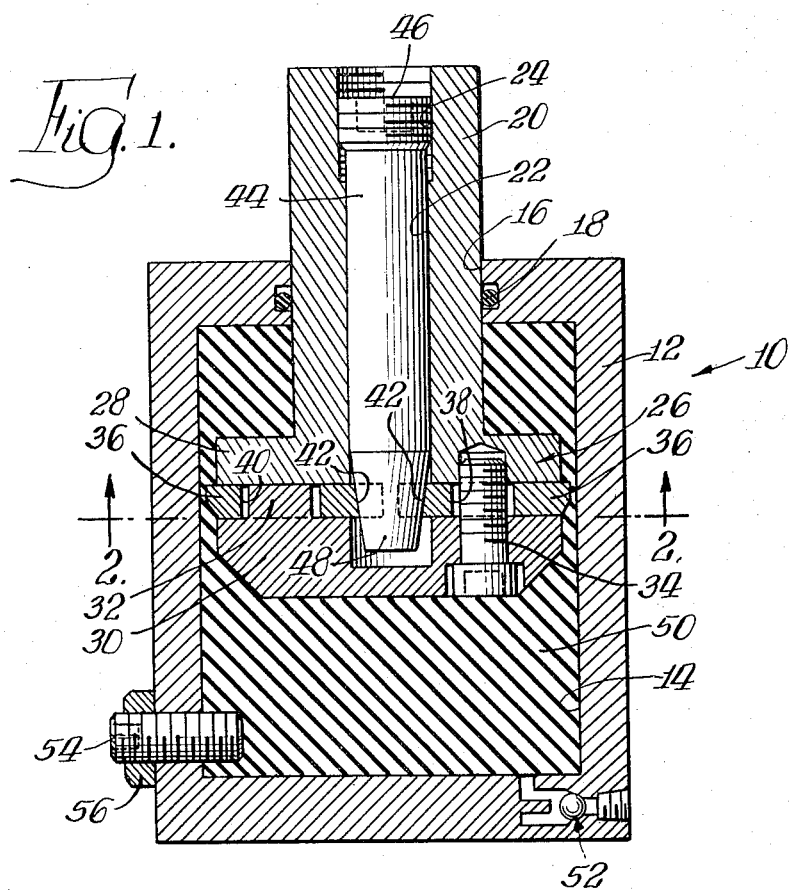
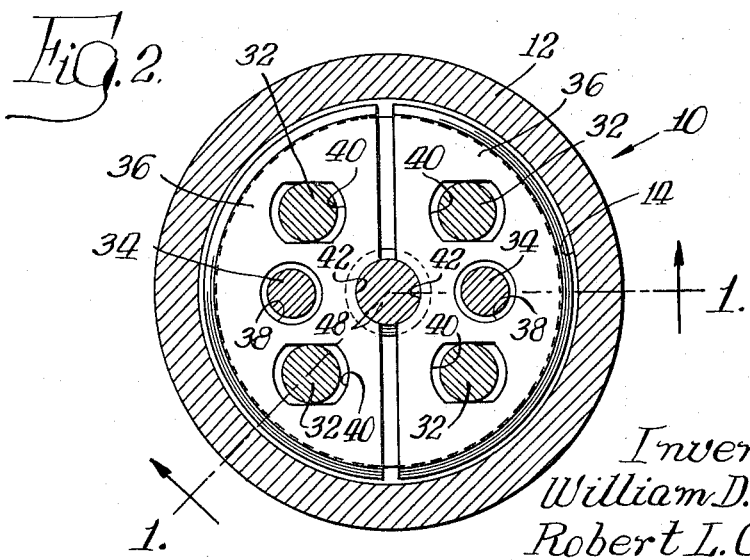
Inventors:—
William D. Wallace,
Robert L. Carlson,
By Edward L. Jurow Atty.

3,369,802
ADJUSTABLE DAMPED SPRING
William D. Wallace and Robert L. Carlson, Chicago, Ill., assignors to W. H. Miner, Inc., Chicago, Ill., a corporation of Delaware
Filed Feb. 2, 1966, Ser. No. 524,554
10 Claims. (Cl. 267—1)

Our present invention relates generally to a damped spring and more particularly to a damped spring having an adjustable piston head.

A damped spring, in general, comprises a housing with a chamber therein, a piston ram extending outwardly of the chamber for receiving impact forces, and piston head means at the end of the piston ram within the chamber. The periphery of the piston head means is spaced from the interior of the chamber whereby to define an orifice, and the chamber is filled with a compressible solid. As the piston ram moves into the chamber in response to impact forces, the reduction in volume of the compressible solid, and the throttling effect produced by the compressible solid being forced through the orifice, impose a damping and spring force on the piston ram and piston head means.

The primary object of our present invention is to provide a damped spring, as described, wherein the piston head means is comprised of piston elements that are radially adjustable in order that the area of the orifice may be selectively varied to alter damping and spring force characteristics.

It is a further object of our present invention to provide a damped spring, as described, which includes means for radially adjusting and positioning the piston elements, and means for guiding the piston elements during radial adjustment.

Now in order to acquaint those skilled in the art with the manner of constructing and using damped springs in accordance with the principles of our present invention, we shall describe in connection with the accompanying drawing, a preferred embodiment of our invention.

In the drawing:

FIGURE 1 is a longitudinal sectional view taken substantially along the line 1—1 in FIGURE 2, looking in the direction indicated by the arrows; and FIGURE 2 is a transverse sectional view taken substantially along the line 2—2 in FIGURE 1, looking in the direction indicated by the arrows.

Referring now to the drawing, there is indicated generally by the reference numeral 10 a damped spring incorporating the principles of our present invention. The damped spring 10 comprises a housing 12 having a cylindrical chamber 14 therein and having an opening 16 in one end wall thereof. Extending through the opening 16, and seal member 18 mounted therein, is a piston ram 20 which is slidably guided and sealed thereby. The piston ram 20 is provided with an axial bore 22 which has threads 24 along a portion thereof. The outer end of the piston ram 20 is adapted to receive impact forces, while the inner end of the piston ram 20 is provided with piston head means 26 that we will presently describe.

The piston head means 26 comprises a radial piston flange 28 which is preferably integrally formed with the piston ram 20, and a piston cap 30 having cylindrical axial projections 32 which may, for example, number four as shown. Suitable means are provided for securing the piston cap 30 to the piston flange 28 with the projections 32 engaging and abutting the latter. Such securing means may include, for example, two diametrically spaced bolts 34 that extend through the piston cap 30 and are threaded into the piston flange 28.

Mounted, with the slight clearance, intermediate of the piston flange 28 and the piston cap 30 are radially adjustable piston elements preferably in the form of a pair of semi-circular piston plates 36. The piston plates 36 are formed with circular apertures 38 through which the bolts 34 extend, and with oblong apertures 40 that accommodate the projections 32. The parallel side edges of the oblong apertures 40 engage the projections 32 for guiding the piston plates 36 during radial adjustment, while the arcuate end edges of the oblong apertures 40 are engageable with the axial projections 32 to limit the extent of radial movement of the piston plates 36. Thus, the axial projections 32 and the interengaging edges of the oblong apertures 40 not only facilitate straight line movement of the piston plates 36 during adjustment but also prevent the piston plates 36 from contacting the interior cylindrical surface of the chamber 14.

The piston plates 36 are further provided with central arcuate tapered edges 42. Disposed in the bore 22 of the piston ram 20 is a rod 44 having an outer threaded end 46 that has threading engagement with the piston ram threads 24 whereby the rod 44 may be axially adjusted relative to the piston ram 20. The adjustable rod 44 also has a tapered inner end 48 that engages the tapered edges 42 of the piston plates 36 for radially adjusting and positioning the piston plates. As will be noted, the outer circumference of the piston plates 36 is spaced from the interior cylindrical surface of the chamber 14 to define a generally annular orifice therebetween. To make the damped spring 10 operational, the chamber 14 is filled with a compressible solid or elastomer 50 such as silicone rubber.

In the operation of the damped spring 10, impact forces received by the piston ram 20 cause the latter and the piston head means 26 to move inwardly of the chamber 14. During such movement, the compressible solid 50 is forced through the annular orifice surrounding the piston head means 26 thereby producing a throttling effect. Also, as the piston ram 20 moves inwardly of the chamber 14, the volume of the compressible solid 50 is reduced thereby increasing the pressure therein. The described throttling effect and volume-pressure change of the compressible solid serve to dissipate the energy of impact forces received by the piston ram 20. When the impact forces are removed from the piston ram 20, the pressure of the compressible solid 50, acting on the unbalanced area of the piston ram, causes the piston head means 26 and piston ram 20 to return to a rest position. During the return stroke of the piston ram 20, the compressible solid flows back through the annular orifice surrounding the piston head means 26 to fill the space being vacated by the latter. In the foregoing circumstances, the compressible solid provides a damping and spring force on the piston ram and piston head means as the piston ram moves into the chamber.

As will be appreciated, the damping and spring force characteristics of the damped spring 10 are a function of the area of the orifice surrounding the piston head means. In accordance with the principles of our present invention, the area of the orifice may be readily varied by adjusting the radial position of the piston plates 36. Such adjustment is effected by changing the axial position of the adjustable rod 44. When the rod 44 is threaded axially inwardly, the tapered end 48 serves to force the piston plates 36 radially outwardly; when the rod 44 is threaded axially outwardly, the enlarged portion of the tapered end 48 moves away from the piston plates 36 permitting the latter to move radially inwardly. By moving the piston plates 36 radially inwardly or outwardly, the clearance between the outer circumference of the piston plates 36 and the interior cylindrical surface of the chamber 14, and hence the orifice thereby defined, is increased or decreased. In this connection, the pressure of the compressible solid 50 acts on the outer periphery of the piston plates 36 to thereby maintain the tapered plate edges 42 in tight engagement with the tapered end 48 of the adjustable rod 44.

To permit the admission of compressible solid into the chamber 14, and yet prevent the escape of compressible solid therefrom, we provide a charging port and ball check valve, indicated generally at 52, in the wall of the housing 12. Additionally, a screw 54 is threaded through the wall of the housing 12 for effecting preloading of the compressible solid 50. As the screw 54 is threaded axially inwardly or outwardly, the initial pressure of the compressible solid is varied. The selected preload pressure acting on the piston ram 20 and piston head means 26 establishes the pre-load setting of the damped spring 10. Once the desired adjustment of the screw 54 has been made, the screw is locked in position by means of a lock nut 56.

Now while we have shown and described what we believe to be a preferred embodiment of our present invention, it will be understood by those skilled in the art that various rearrangements and modifications may be made therein without departing from the spirit and scope of our invention.

We claim:

1. A damped spring comprising a housing with a chamber therein, a piston ram extending outwardly of said chamber for receiving impact forces, piston head elements carried at the end of said piston ram within said chamber, the outer circumference of said piston head elements being spaced from the interior of said chamber to define an orifice therebetween, said piston head elements being radially adjustable whereby the area of said orifice may be varied, and a compressible solid filling said chamber for providing a damping and spring force on said piston ram as the same moves into said chamber and reduces the volume of said compressible solid while the latter is forced through said orifice.

2. The damped spring of claim 1 including means carried by said piston ram for radially adjusting and positioning said piston head elements.

3. The damped spring of claim 2 including means carried by said piston ram and interengageable with said piston head elements for guiding the same during radial adjustment.

4. A damped spring comprising a housing with a cylindrical chamber therein, a piston ram extending outwardly of said chamber for receiving impact forces, piston head means at the end of said piston ram within said chamber, said piston head means including piston plates, the outer circumference of said piston plates being spaced from the interior cylindrical surface of said chamber to define an orifice therebetween, said piston plates being radially adjustable whereby the area of said orifice may be varied, and a compressible solid filling said chamber for providing a damping and spring force on said piston ram and said piston head means as said piston ram moves into said chamber and reduces the volume of said compressible solid while the latter is forced through said orifice.

5. The damped spring of claim 4 wherein said piston head means includes a piston flange, a piston cap having axial projections, and means securing said piston cap to said piston flange with said axial projections engaging the latter; and wherein said piston plates are mounted intermediate said piston flange and said piston cap.

6. The damped spring of claim 5 wherein said piston plates are provided with oblong apertures to accommodate said axial projections, the side edges of said apertures engage said projections for guiding said piston plates during radial adjustment, and the end edges of said apertures are engageable with said projections for limiting the extent of radial movement of said piston plates.

7. The damped spring of claim 6 wherein said piston plates have central arcuate tapered edges, and including an axially adjustable rod disposed in said piston ram and having a tapered end that engages said tapered edges of said piston plates for radially adjusting and positioning said piston plates.

8. The damped spring of claim 7 including means for varying the initial pressure of said compressible solid in said chamber.

9. For use in a damped spring, piston head means comprising, in combination, a piston flange, a piston cap having axial projections, means securing said piston cap to said piston flange with said axial projections engaging the latter, radially adjustable piston plates mounted intermediate said piston flange and said piston cap, said piston plates being provided with oblong apertures to accommodate said axial projections, the side edges of said apertures engaging said projections for guiding said piston plates during radial adjustment, and the end edges of said apertures being engageable with said projections for limiting the extent of radial movement of said piston plates.

10. The combination of claim 9 wherein said piston plates have central arcuate tapered edges; and including a piston ram extending from said piston flange, and an axially adjustable rod disposed in said piston ram and having a tapered end that engages said tapered edges of said piston plates for radially adjusting and positioning said piston plates.

References Cited

UNITED STATES PATENTS

| | | | |
|---|---|---|---|
| 2,846,211 | 8/1958 | Taylor | 267—64 |
| 2,984,478 | 5/1961 | Westcott | 267—64 |

ARTHUR L. LA POINT, *Primary Examiner.*

R. M. WOHLFARTH, *Assistant Examiner.*